Nov. 10, 1959  A. C. JOHNSON  2,912,024
LOG LOADER FOR VENEER LATHES
Filed May 7, 1956  3 Sheets-Sheet 1
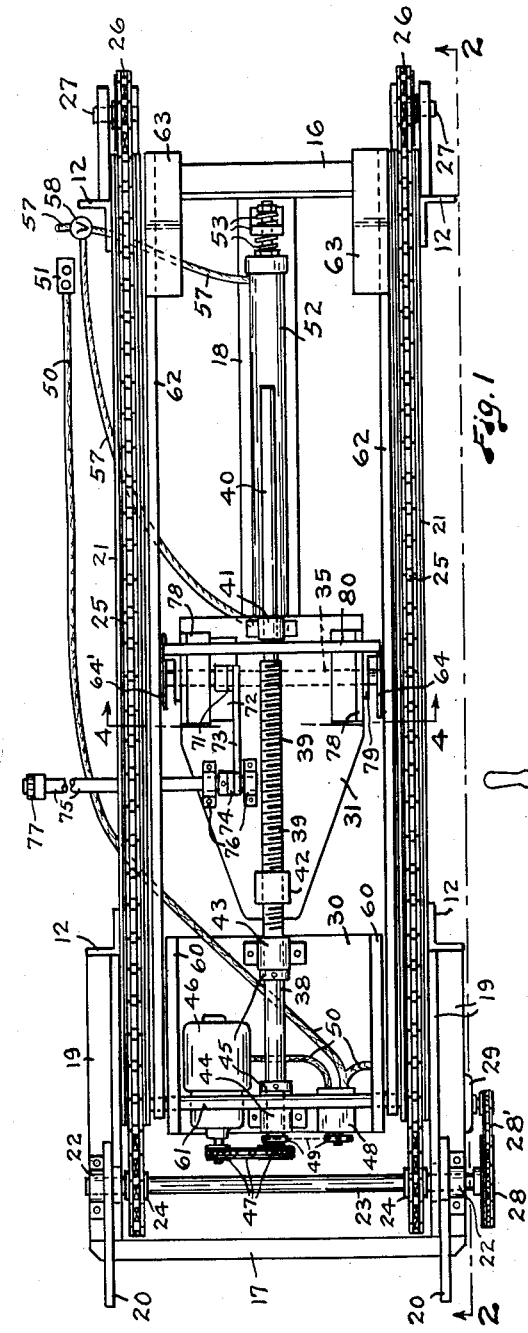
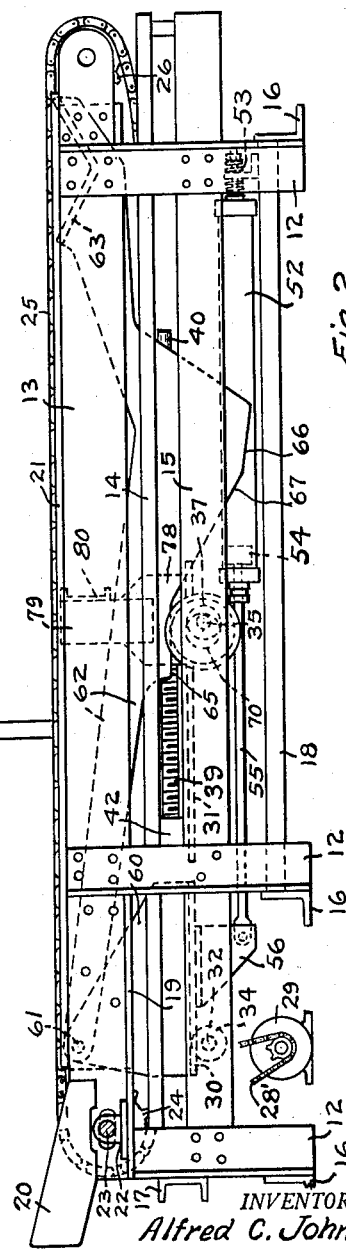
INVENTOR.
Alfred C. Johnson
BY Fred C. Matheny
ATTORNEY Nov. 10, 1959     A. C. JOHNSON     2,912,024
LOG LOADER FOR VENEER LATHES
Filed May 7, 1956     3 Sheets-Sheet 2
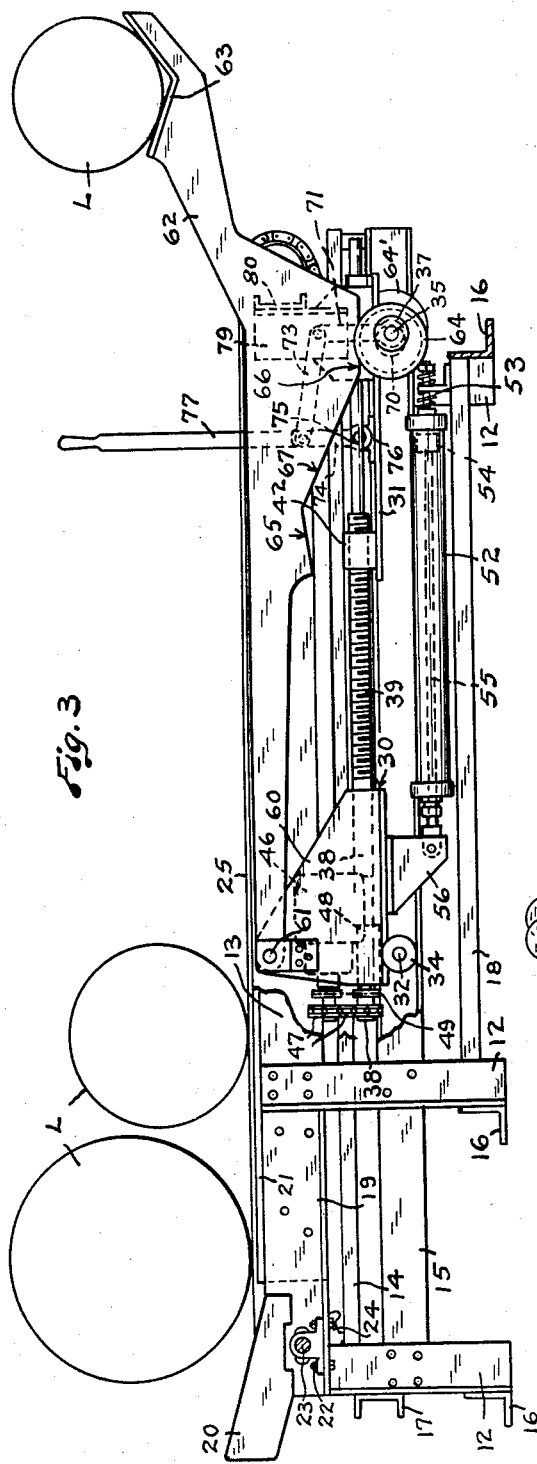
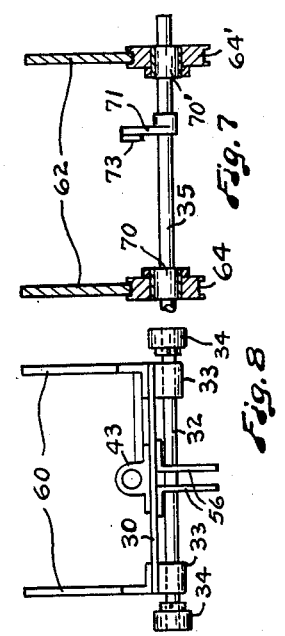
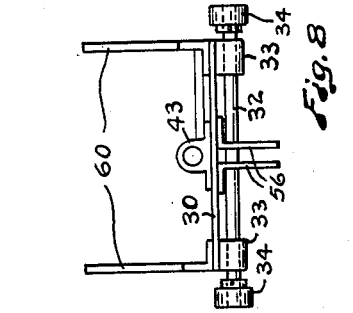
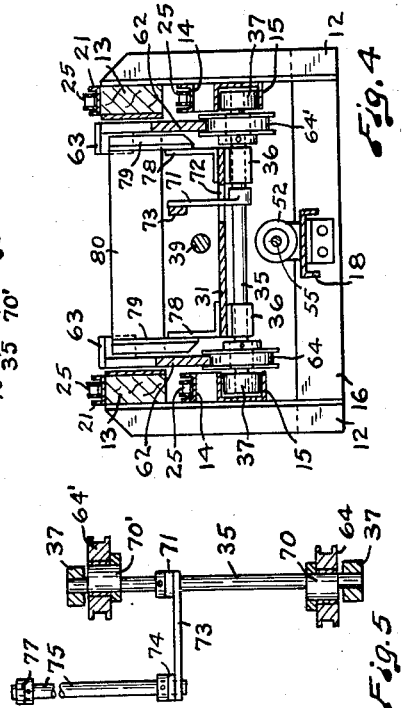
INVENTOR.
Alfred C. Johnson
BY
Fred C. Matheny
ATTORNEY Nov. 10, 1959          A. C. JOHNSON          2,912,024
LOG LOADER FOR VENEER LATHES
Filed May 7, 1956          3 Sheets-Sheet 3
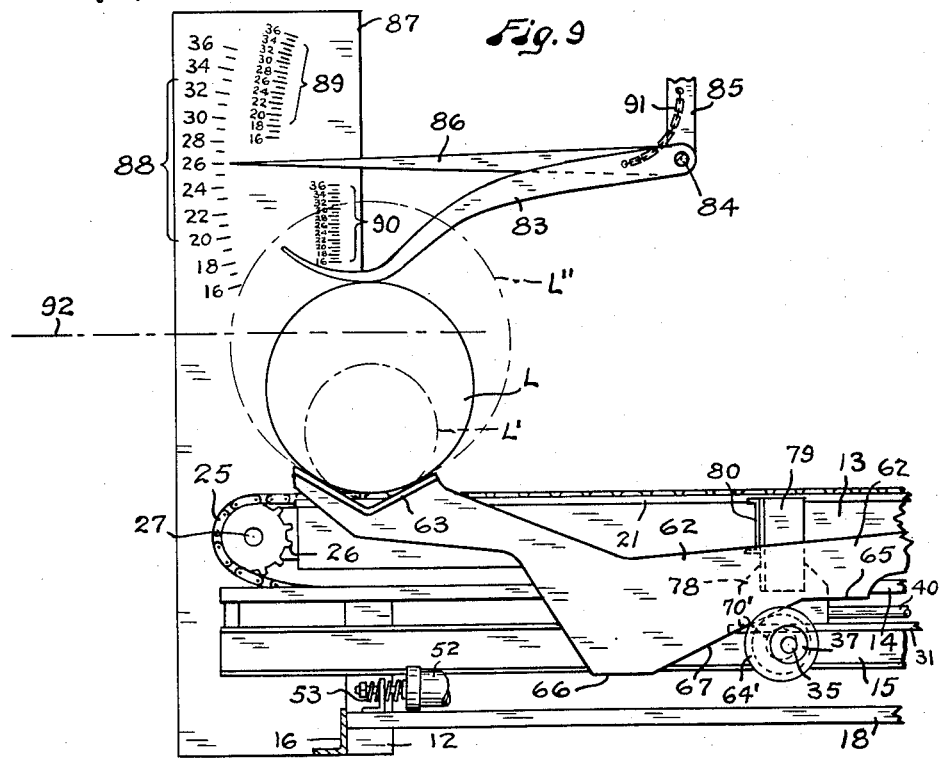
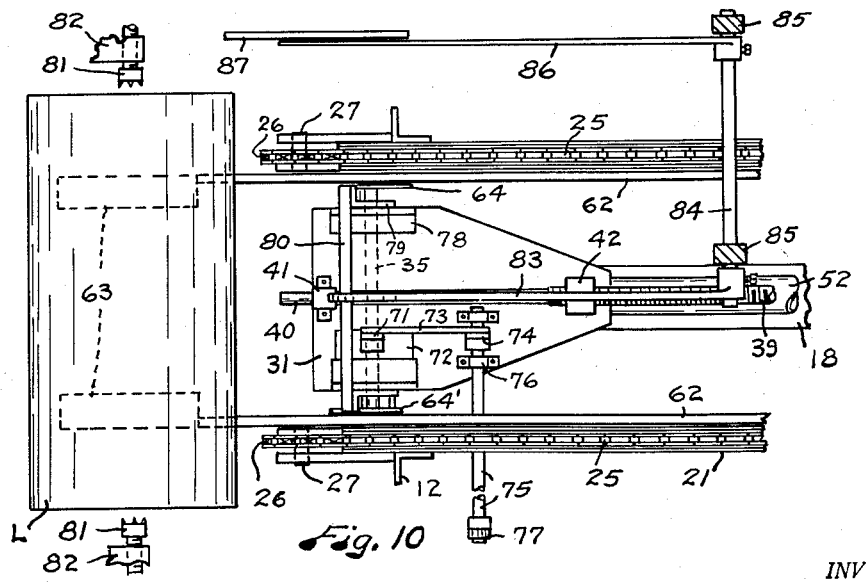
INVENTOR.
Alfred C. Johnson
BY Fred C. Matheny
ATTORNEY

United States Patent Office 2,912,024
Patented Nov. 10, 1959

2,912,024

LOG LOADER FOR VENEER LATHES

Alfred C. Johnson, Seattle, Wash., assignor to E. B. Plywood Machines, Seattle, Wash., a corporation of Washington Application May 7, 1956, Serial No. 583,171

8 Claims. (Cl. 144—209)

This invention relates to a log loader for veneer lathes and an object of this invention is to provide a simple and efficient loader for supplying peeler logs to and properly positioning these logs in the chuck mechanism of a veneer lathe.

Another object is to provide a machine of this type which will save time in the chucking of the peeler logs and will reduce waste and conserve timber by facilitating the accurate centering of these logs in the lathe.

Other objects are to provide simple and efficient means for lifting the logs one at a time off of feed chains and for relatively vertically adjusting the two end portions of the lifted logs and for advancing and properly positioning the lifted logs between the chucks of a veneer lathe.

Another object of this invention is to provide a log loader for a veneer lathe having devices which will measure the diameter of each log midway of its length and which will facilitate using this medially measured diameter as a guide in centering the log in a lathe so that peeling of usable veneer from the log may start on a cylindrical path of the maximum possible diameter for that log.

Other objects of this invention will be apparent from the following description and accompanying drawings.

In the drawings:

Figure 1 is a plan view of a machine constructed in accordance with this invention, showing the log lifting devices lowered and retracted, some of the log measuring and log position indicating means being omitted.

Fig. 2 is a side elevation, with a part in section, looking in the direction of broken lines 2—2 of Fig. 1, the log measuring and position indicating means being omitted.

Fig. 3 is a side elevational view with parts in section and a portion of the frame broken away and with the log lifting devices elevated and moved to the right and supporting a log in a position for chucking.

Fig. 4 is a view in cross section with parts in elevation taken substantially on broken line 4—4 of Fig. 1.

Fig. 5 is a detached assembly view partly in plan and partly in section of eccentric type log loader arm adjusting means embodied in this machine.

Fig. 6 is a detached end view of the shaft with eccentric bearing members shown in Fig. 5.

Fig. 7 is a detached view partly in section and partly in elevation illustrating the operation of the loader arm adjusting means.

Fig. 8 is a detached end view of a movable carriage member used at the intake or head end of the machine.

Fig. 9 is a fragmentary elevational view, with parts in section and parts of the frame omitted, and illustrating the log measuring and log position indicating means.

Fig. 10 is a plan view of the appraatus shown in Fig. 9 with a log advanced to a position between the chucks of a lathe.

Like reference numerals refer to like parts throughout the several views.

This machine has a generally rectangular frame comprising upright legs 12, longitudinally extending side bars 13, 14 and 15 secured to and supported by the legs, cross bars 16 and 17 secured to the legs and serving as cross braces, and a longitudinally extending medially positioned channel bar 18 secured between two of the cross bars 16 toward the discharge end of the machine, shown at the right in Figs. 1, 2 and 3. The top side bars 13 terminate short of the forward or intake end of the machine, which is shown at the left in Figs. 1, 2 and 3. Two angle bars 19 are secured to the outer sides of the forward end portions of these side bars 13 and extend beyond the ends of the side bars. Two slightly inclined log receiving bars 20 are secured to the angle bars 19 and overhang the head or intake end of the machine.

The two uppermost side bars 13 are log supporting bars and they have channel shaped track members 21 mounted on their upper edges. The narrow medial side bars 14 are channel bars with their channel or trough sides uppermost and they also serve as track members. The lowermost side bars 15 are channel bars with their channel or trough sides inwardly directed to serve as tracks.

The angle bars 19 at the forward end of the machine support two bearings 22 in which a cross shaft 23 is journaled. Two sprocket wheels 24 are secured on the shaft 23 in planes common to the two channel shaped tracks 21 and 14 at the respective sides of the machine and two endless log carrying sprocket type feed chains 25 pass around these sprocket wheels 24 and are supported and guided in the channel shaped tracks 21 and 14. These sprocket chains 25 pass around other sprocket wheels 26 which are mounted on bearing axles 27 near the discharge or delivery end of the machine.

Preferably the shaft 23 on which the sprocket wheels 24 are secured is connected with suitable operator controlled means by which it may be driven to advance the log carrying sprocket chains 25 any desired amount. For instance, a sprocket wheel 28, Fig. 1, may be secured on this shaft and connected by a link belt 28' with preferably a reversible electric motor 29 which can be controlled by an operator standing in a desired position near the machine.

Peeler Logs L, Fig. 3, which usually have had the bark removed therefrom, are placed on this machine with the logs extending crosswise of the frame and the feed chains and rest on and are moved by the feed chains 25. These logs are picked up one at a time, by log lifting carriage means and properly positioned for chucking in a lathe.

The log lifting carriage means comprises a front carriage frame or member 30 and a rear carriage frame or member 31 supported by and movable lengthwise of the main frame and connected with each other by means which makes it possible to longitudinally move said two carriage frames 30 and 31 toward and away from each other. The front carriage frame 30 has a bottom cross shaft 32, Fig. 8, supported below it in bearings 33. Two rollers 34 are mounted on the respective end portions of the cross shaft 32 and run in the track channels 15.

The rear carriage frame 31 has a cross shaft 35 mounted below it in bearings 36, Fig. 4, and two rollers 37 are rotatively mounted on the respective end portions of the shaft 35 and run in the track channels 15. The shaft 35 is of special construction and is also used in tiltably adjusting the peeler logs, as more fully hereinafter described.

The two carriage members 30 and 31 are adjustably connected with each other by a coupling shaft 38 having a threaded part 39 and a non-threaded terminal part 40. The terminal part 40 extends slidably through a bearing member 41 which is rigidly attached to the rear end of the rear carriage member 31, as shown at the right in Figs. 1, 2 and 3. The threaded part 39 of the coupling shaft is threaded through a nut 42 which is secured to the other end portion of the rear carriage member 31. The non-threaded part of the coupling shaft shown at the left in Figs. 1, 2, and 3 extends rotatively through two spaced apart bearing members 43 and 44 on the front carriage member 30. Thrust collars 45 on the coupling shaft 38 prevent endwise movement of said shaft relative to the front carriage member 30. A reversible motor 46 having built in speed reduction transmission means is connected by link belt and sprocket wheel means 47 with the coupling shaft 38 for driving said shaft in either direction.

A governor 48 of conventional construction is driven from the coupling shaft 38 through link belt and sprocket wheel means 49. Suitable limit switches in said governor are electrically connected in the circuit of the motor 46 in such a manner as to stop said motor when the rear carriage has been moved close to the front carriage 30 into a position, for instance, as shown in Figs. 1 and 2 and when said rear carriage has been moved a predetermined distance away from the front carriage into a position as shown in Fig. 3. Suitable electrical conductor wires are provided in cables 50 and a control switch 51 by which an operator may control the motor 46, within the limits allowed by the governor 48, is provided at any desired location.

Means operated by fluid pressure, preferably hydraulic, is connected with the front carriage member 30 for simultaneously moving both carriage members 30 and 31 longitudinally of the main frame. This means comprises a longitudinally extending fluid pressure cylinder 52 having one end secured by shock absorbing anchor means 53 to the frame bar 18. A piston 54 in the cylinder 52 is connected by a piston rod 55 with brackets 56 which are rigid with the front carriage 30 so that movement of piston 54 in cylinder 52 will move both carriage members 30 and 31 lengthwise of the main frame. Conduits 57 connected with the cylinder 52 and with a control valve 58 provide for the controlled admission and exhaust of fluid under pressure relative to cylinder 52. The spring anchor means 53 will absorb some shock but the carriage means will always be stopped and securely held in the same positions at both limits of its travel.

The front carriage 30 has two upright side members 60. A shaft 61 extends crosswise through the upper portions of the side members 60 and two loader arms 62 have their end portions pivotally mounted on the shaft 61. The loader arms 62 are positioned adjacent to the inner sides of the respective frame bars 13. The end of each loader arm 62, which is shown at the right in Figs. 1, 2 and 3, has a fork or saddle plate 63 welded or otherwise rigidly secured thereto providing a log engagement part of substantial width. The loader arms 62 rest on grooved rollers 64 and 64' which are carried by cross shaft 35 of the carriage member 31 and the lower edge of each loader arm 62 is shaped to provide two approximately horizontal roller engaging track surfaces 65 and 66 between which is an inclined roller engaging track surface 67.

The grooved rollers 64 and 64' on which the loader arms 62 rest are rotatively mounted on eccentric cylindrical bearing members 70 and 70' respectively which are integral with, or otherwise rigidly secured to, the shaft 35. The two eccentric bearing members 70 and 70' are offset on shaft 35 in substantially opposite radial directions, as shown in Figs. 5 and 6. The oppositely extending eccentric members 70 and 70' will normally be positioned with their centers in a substantially horizontal plane, as shown in Fig. 6. When members 70 and 70' are thus positioned rotative movement of shaft 35 will eccentrically move the grooved rollers 64 and 64' about the axis of said shaft 35 and in so doing will simultaneously impart equal vertical movement in opposite directions to the two loading arms which rest on the grooved rollers 64 and 64'. For instance, when the eccentric members 70 and 70' are positioned so that their two axes are in a common horizontal plane, as shown in Figs. 3, 4, 5 and 6, the two loader arms 62 are supported at the same level but if these two eccentric members are angularly moved away from this position, as illustrated in Fig. 7, then one loader arm will be raised and the other loader arm will be lowered. Thus the two end portions of a log L resting on the saddle plates 63 can be relatively vertically adjusted to properly position the log.

The means herein shown for rotatively adjusting the shaft 35 comprises a lever arm 71 secured to said shaft 35 and extending upwardly through an opening 72 in the rear carriage member 31. A link 73 connects the upper end of lever arm 71 with another upwardly extending lever arm 74 on a horizontal shaft 75 which is supported for rocking movement in bearings 76 and extends outwardly from one side of the machine and is provided with an upwardly extending lever 77.

The carriage member 31 has two angle brackets 78 extending upwardly from opposite sides thereof and an angle bar 79 is secured to each angle bracket and extends above it. A cross bar 80 is secured to the upper ends of the angle bars 79. The parts 78, 79 and 80 form a guide frame positioned between and close to the two loader arms 62 and which is adapted to be engaged by said loader arms to help prevent twisting and widewise movement of these loader arms.

Preferably log measuring and log position indicating devices, see Figs. 9 and 10, are provided near the discharge end of the machine to measure the diameter of the log medially of its length and to indicate the proper vertical positioning of the axis of the log for most efficient chucking. These log measuring and log position indicating devices enable the operator to read the medial diameter of the log in inches and to correctly position said log vertically with its axis in proper vertical alignment with the chucks 81 of a lathe 82. The measurement of the log diameter is taken while the log rests on the feed chains 25 and is correctly positioned under the measuring device. The log is then properly vertically positioned and moved into correct longitudinal alignment with the chucks 81.

The log measuring and positioning means shown fragmentarily in Fig. 1 and more fully in Figs. 9 and 10, comprises a lever 83 positioned mid way between the two sides of the machine and extending longitudinally thereof above the logs and across the position occupied by the log L which is about to be lifted and placed in the chucks 81 of the lathe 82. The lever 83 is rigidly but adjustably secured to a transverse rock shaft 84 which is mounted in bearings 85. A pointer 86 is fixedly secured to the rock shaft at one side of the machine and moves in synchronism with the lever 83 over a graduated dial board 87. Preferably three scales or sets of graduations 88, 89 and 90 are provided on plate 87. Stop means, such as a flexible chain or cable 91, is provided to limit the downward swinging movement of the lever 83 and pointer 86. Broken line 92 in Fig. 9 indicates the horizontal plane of the chucks 81.

In the use of this loader the peeler logs L, which usually have had the bark removed therefrom, are deposited by a crane or like log handling means on the intake end of the loader near or partly on the inclined log receiving bars 20. The operator advances these logs, as desired, by energizing the motor 29. If the carriage means is retracted, as shown in Figs. 1 and 2, and a log is to be placed in the chucks 81 of a lathe 82 the operator positions the log nearest the lathe over the forks 63 of the loader arms 62. He then energizes the motor 46 and moves the carriage member 31 toward the lathe 82 while the head carriage member remains fixed and immovable. This causes the grooved rollers 64 and 64' to move under the inclined edge parts 67 of the loader arms 62 and raise said loader arms until the forks 63 engage with the log and accurately position said log longitudinally of the machine with the log still in contact with the feed chains 25 and the lever 23 resting on and positioned by the log. The motor 46 can be stopped at any desired instant and with the rollers 64 and 64' in any position under the inclined parts 67 of the loader arms 62 without danger of relative movement between the two carriage members 30 and 31 because the coupling shaft screw 39 is self locking. The head carriage member 30 is always held in a fixed position by its fluid pressure actuating means when the valve 58 is closed.

With a log L properly positioned, as shown in Fig. 9, and the lever 83 resting on it the pointer 86 will indicate on the scale 88 the correct diameter of the log. Having observed this log diameter reading, the operator will further raise the log until the top edge of the pointer 86 coincides with a similar reading on the scale 89 and in so doing will correctly position the log with its axis in the horizontal plane of the axis of the chucks 81, this plane being indicated by broken line 92 in Fig. 9. Thus when pointer 86 in Fig. 9 points to "26" on scale 88, with the log L resting on the feed chains 25, the operator knows that said log will have to be raised enough to position said pointer on "26" on scale 89 to properly vertically center the log for chucking. The hydraulic carriage moving means will position all logs L in the correct horizontal position for centering in the chucks 81.

The dot and dash circle L' in Fig. 9 indicates a log of minimum diameter and the dot and dash circle L" a log of maximum diameter, both of which can be vertically centered on line 92 in the same manner as the log L.

The scale 90 is positioned and graduated so that when a horizontal plane tangent with the top of the log coincides, on scale 90, with a number which has been indicated by pointer 86 on scale 88, then the axis of the log will be properly positioned vertically in the horizontal axial plane of the chucks 81. Thus the operator by sighting across the top of the log at scale 90 can check the position of the log or can even properly position the log vertically without reference to scale 89.

After a log has been raised off of the feed chains 25 and before the chucks 81 are engaged with the ends of said log the operator uses the lever 77 to move the eccentric bearing members 70 and 70' and properly level the log. These eccentric members level the log by simultaneously raising one end and lowering the other end equal amounts and thus the vertical position of the medial portion of the log is not changed. Thus if a log has been elevated to the plane indicated by the pointer 86 it can be leveled by the eccentrics 70 and 70' without moving it out of this plane.

The foregoing description and accompanying drawings disclose a preferred embodiment of this invention but it will be understood that changes can be made within the scope of the following claims.

I claim:

1. In apparatus for supplying peeler logs to a veneer lathe, a frame; spaced apart log carrying feed chains movable longitudinally of said frame capable of supporting and transversely conveying logs with the logs extending crosswise of the frame and feed chains; carriage means supported by and movable longitudinally of said frame; two transversely spaced apart longitudinally extending vertically swingingly movable loader arms each having one end pivotally connected with said carriage means; log engaging forks rigid with the movable end portions of said loader arms; loader arm elevating means operable in vertically moving said arms and lifting a log off of said feed chains; and carriage moving means operable in moving said carriage and positioning a log supported by the forks of said arms between the chucks of a lathe.

2. In apparatus for supplying peeler logs to a veneer lathe, a frame; spaced apart endless traveling feed chains movable longitudinally of said frame capable of supporting and transversely conveying logs with the logs extending crosswise of the frame and feed chains; carriage means supported by and movable longitudinally of said frame; two transversely spaced apart longitudinally extending vertically swingingly movable loader arms having their forward ends pivotally connected with said carriage means and having transversely aligned log lifting forks at the ends thereof remote from their pivots; loader arm elevating means operable in vertically moving said arms and lifting a log off of said feed chains; loader arm adjusting devices connected with said elevating means providing relative vertical adjustment of said loader arms in leveling a log supported thereon; and carriage moving means operable in moving said carriage and positioning a log supported by the fork portions of said arms between the chucks of a lathe.

3. In apparatus for supplying peeler logs to a veneer lathe a frame; spaced apart endless feed chains movable longitudinally of said frame capable of supporting and transversely conveying logs with the logs extending crosswise of the frame and feed chains; carriage means movable longitudinally of said frame; two transversely spaced apart longitudinally extending vertically swingingly movable loader arms having their forward ends coaxially pivotally mounted on said carriage means and having transversely aligned log lifting forks at their other ends; two rollers supporting the fork equipped end portions of the respective loader arms; a shaft extending through said rollers; two eccentric bearing members on said shaft rotatively supporting the respective rollers, the eccentric positioning of said two bearing members being substantially diametrically opposite; and adjusting means connected with said shaft, providing rotative adjustment of said shaft, whereby the fork equipped end portions of said loader arms may be simultaneously vertically adjusted in opposite directions.

4. The apparatus as claimed in claim 3 in which the lower edge of each loader arm is provided with an inclined track part and the rollers which support the loader arms are movable under said inclined track parts in vertically moving the loader arms.

5. In apparatus for supplying peeler logs to a veneer lathe, a frame; two generally horizontal spaced apart parallel loader arms of similar construction and size supported by said frame and each pivoted at one end for swinging movement about an axis transverse to the frame, said loader arms having transversely aligned log lifting forks at their other ends; two rollers supporting the fork equipped end portions of the respective loader arms; two bearing members supporting the respective rollers for rotation about centers which are offset horizontally relative to each other; and bearing member adjusting means rigid with said two bearing members providing simultaneous adjustment of said two bearing members about an axis positioned mid way between the axes of said two bearing members, whereby adjustment of said two bearing members will simultaneously vertically adjust the roller supported end portions of said two loader arms equal amounts in opposite vertical directions in leveling a transversely extending log supported on said two transversely aligned log lifting forks of the loader arms.

6. In apparatus for supplying peeler legs to a veneer lathe, a frame capable of receiving and supporting logs with the logs extending crosswise of the frame; a first carriage member positioned toward one end of said frame supported by and movable longitudinally of said frame; two transversely spaced apart parallel longitudinally extending loader arms each pivoted at one end to said first carriage member for vertical swinging movement about a common axis transverse to said frame, each loader arm having an inclined track surface on its lower edge and having a log lifting fork on its upper edge near the end of the loader arm remote from the pivot; carriage moving and holding means connected with said first carriage member; a second carriage member supported by and movable longitudinally of said frame; adjustable coupling means connecting said two carriage members providing relative longitudinal movement of said two carriage members; and two rollers carried by said second carriage member supporting the fork carrying portions of said loader arms and cooperating with the inclined track surfaces of the lower edges of said loader arms in vertically moving said loader arms when said two carriage members are relatively longitudinally adjusted.

7. The apparatus as claimed in claim 6 in which a threaded coupling shaft connects the two carriage members and power operated devices carried by one of said carriage members are connected with said coupling shaft providing rotation of said coupling shaft in relatively longitudinally moving said two carriage members.

8. In apparatus for supplying peeler logs to a veneer lathe, a frame having a log receiving end; two spaced apart endless log carrying feed chains movably supported by and extending longitudinally of said frame capable of supporting and transversely conveying logs with the logs extending crosswise of the frame and feed chains; a first carriage member positioned adjacent the log receiving end of said frame supported by and movable longitudinally of said frame; hydraulic cylinder and piston means interconnected between said first carriage member and said frame providing controlled longitudinal movement and fixed holding of said first carriage member relative to said frame; two transversely spaced apart longitudinally extending loader arms each pivoted at one end to said first carriage member for vertical swinging movement about a common transverse axis, each loader arm having an inclined track surface on its lower edge and having a log lifting fork portion on its upper edge near the end remote from the pivot; a second carriage member supported by and movable longitudinally of said frame; a threaded coupling shaft connecting said two carriage members; shaft rotating power means mounted on said first carriage member and connected with said coupling shaft providing movement of said second carriage member relative to said first carriage member; two rollers carried by said second carriage member supporting the fork equipped end portions of said loader arms and co-operating with the inclined track surfaces of the lower edges of said loader arms in controlling vertical positioning of said loader arms in response to longitudinal movement of said second carriage relative to said first carriage; and loader arm adjusting devices connected with said rollers providing relative vertical adjustment of the fork carrying end portions of said loader arms in tiltingly axially adjusting a transversely extending log supported on the log lifting fork portions of the two loader arms.

References Cited in the file of this patent
UNITED STATES PATENTS

| | | |
|---|---|---|
| 2,224,728 | Gulliksen | Dec. 10, 1940 |
| 2,507,727 | Loxham | May 16, 1950 |
| 2,702,570 | Rothrock | Feb. 22, 1955 |
| 2,756,788 | Fish | July 31, 1956 |